United States Patent [19]

Kramer

[11] Patent Number: 5,018,933

[45] Date of Patent: May 28, 1991

[54] DEVICE FOR TRANSFERRING AN INVALID TO AND FROM AN AUTOMOBILE

[75] Inventor: Dale C. Kramer, Port Colborne, Canada

[73] Assignee: KHP, Inc., Snyder, N.Y.

[21] Appl. No.: 504,325

[22] Filed: Apr. 3, 1990

[30] Foreign Application Priority Data

Apr. 25, 1989 [GB] United Kingdom ................. 8907363
Apr. 3, 1989 [GB] United Kingdom ................. 8907456

[51] Int. Cl.[5] ......................... B60P 1/00; B66C 23/06

[52] U.S. Cl. .................................... 414/542; 414/921; 414/462; 212/182; 212/209; 212/225; 212/228; 212/230; 212/267; 52/116; 5/81 R

[58] Field of Search ............... 212/168, 177, 211, 225, 212/227, 228, 229, 230, 231, 257, 264, 267-269; 414/462, 541, 542, 921, 342, 543, 560-562; 52/116, 117; 224/310-311

[56] References Cited

U.S. PATENT DOCUMENTS

| | | | |
|---|---|---|---|
| 2,650,725 | 9/1953 | Hoyer et al. | 212/231 |
| 3,051,419 | 8/1962 | Weiland et al. | 414/542 |
| 3,174,634 | 3/1965 | Peck | 414/540 |
| 3,656,637 | 4/1972 | Lynn et al. | 414/462 |
| 3,687,323 | 8/1972 | Pingon | 212/267 |
| 4,021,019 | 5/1977 | Sanders | 212/191 |
| 4,278,387 | 7/1981 | Seguela et al. | 414/921 |
| 4,544,321 | 10/1985 | Lanier | 414/921 |

FOREIGN PATENT DOCUMENTS

| | | | |
|---|---|---|---|
| 345761 | 2/1981 | U.S.S.R. | 212/229 |
| 1383457 | 2/1975 | United Kingdom | 414/921 |
| 1427838 | 3/1976 | United Kingdom | 414/921 |

*Primary Examiner*—Joseph F. Peters, Jr.
*Assistant Examiner*—R. B. Johnson
*Attorney, Agent, or Firm*—Sommer, Oliverio & Sommer

[57] ABSTRACT

A device (10) for transferring an invalid includes a beam (11) comprised of two telescopically received tubes (12,13); a track (14), slidably engaged within said beam capable of supporting a rolling trolley (15) and connected winch (16) for providing a vertical lifting force. A seat (18) is appended to winch (16) by a winch yoke (19). The device is secured transversely to the roof surface of an automobile by clamps (21,22) mounted to the beam and track. The invalid is positioned within the seat and lifted vertically by the winch and is then slided into or out of the automobile as desired.

11 Claims, 7 Drawing Sheets

DEVICE FOR TRANSFERRING AN INVALID TO AND FROM AN AUTOMOBILE

TECHNICAL FIELD

The present invention relates generally to the field of devices for assisting the movement of incapacitated or invalid persons and in particular, to a device for transferring an invalid from an automobile to a location outside and adjacent the automobile (e.g., a wheelchair) and vice-versa.

BACKGROUND ART

Paraplegics, invalids and incapacitated individuals who have lost full or partial use of their legs have long had difficulty getting into and out of automobiles or similar vehicles due, in part, to the often cramped and inconvenient design of most automobile passenger compartments and, in part, to the lack of practical devices to aid such movement.

A variety of devices have been employed to alleviate the problem; however, most of these have proved to be inefficient, unreliable, mechanically complex, relatively expensive and inconvenient for routine use. For example, U.S. Pat. No. 3,910,432 (Brown, et al.) describes a device for transferring an invalid or incapacitated person to and from a vehicle; however, it can be readily determined that this device is mechanically complex and requires modification of the subject vehicle for proper use. Accordingly, the device is inflexible, and use is limited to certain specially configured vehicles. U.S. Pat. Nos. 2,651,725 (Hoyer, et al.) and 1,614,769 (Amsler) suffer from similar disadvantages.

U.S. Pat. No. 3,656,637 (Lynn, et al.) describes a device that is much less mechanically complex than the prior art and requires no modification of the vehicle for proper use. This device, however, suffers from a number of deficiencies, too. For example the beam of the device is secured to the automobile by clamps which are formed to fit the "rain gutter" of the automobile roof. The device, therefore, is not easily or readily adaptable to vehicles not having a "rain gutter" or a similar roof construction. Further, the clamps described and used with the device freely and loosely move across the support beam and are eventually hand tightened by a screw during operation allegedly to conform to various automobile roof widths. This poses a particularly dangerous situation attributable to insecure clamps, improper tightening or improper positioning. The device also is devoid of features to secure its separable parts or to selectively position the trolley along the track over which the lifted and transported invalid rides. These deficiencies, too, present safety concerns and exacerbate the difficulties attendant to efficient movement of the invalid to and from an automobile and vice-versa.

The present invention, however, remedies the deficiencies of the prior art and provides a safe, efficient and convenient means for transferring an invalid. Further, the present invention is readily adaptable to almost all automobile roof configurations and is secured by stable and substantially stationarily deposed clamps. Moreover, the device includes various other means to insure safe transfer of the invalid, while permitting the operator to concentrate on the invalid's comfort and position without regard to the device or its operation.

DISCLOSURE OF THE INVENTION

Figure 1:
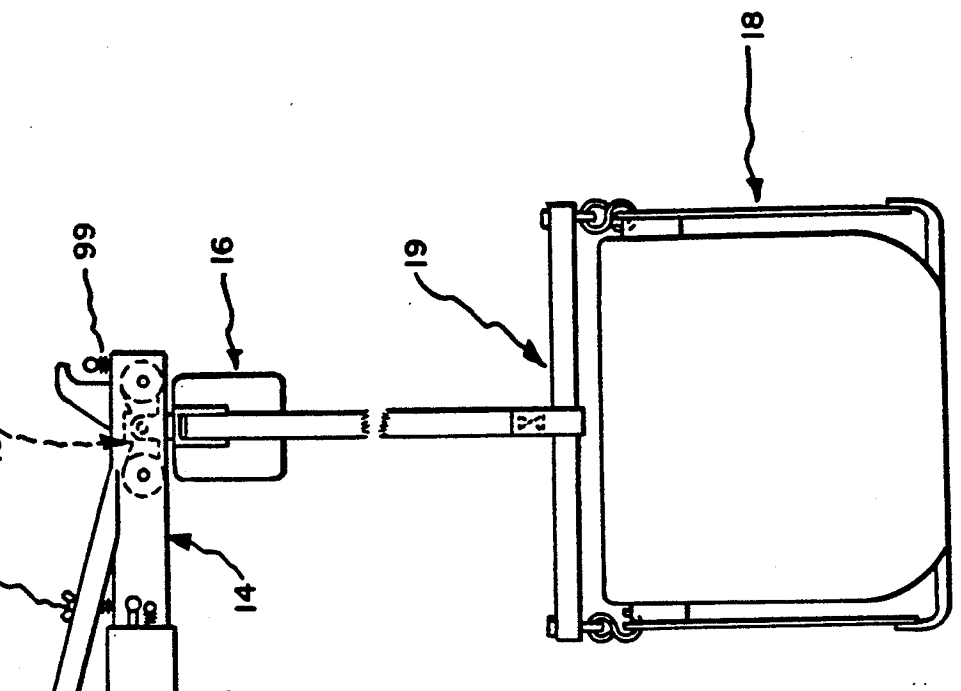
FIG. 1 is a rear view of the device showing the beams, track, appended winch yoke and seat.
Figure 1:
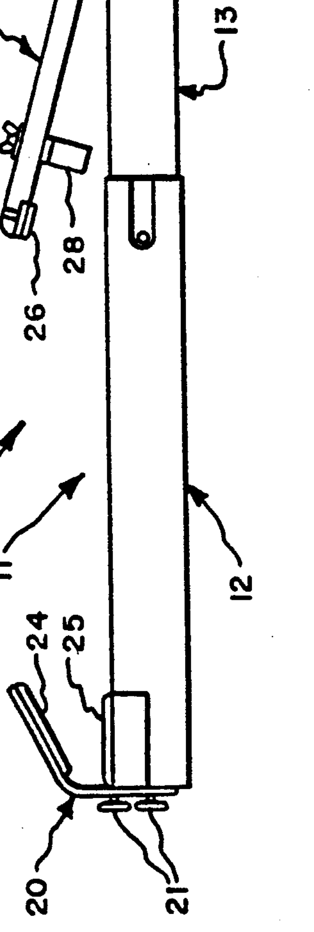

Parenthetically referring to the parts, surfaces and elements of the preferred embodiment described and disclosed therein, the present invention provides a device (e.g., 10) for transferring an invalid or incapacitated person to an from an automobile.

In particular, the invention comprises a retractable beam (e.g., 11) having two telescopically joined tubes (e.g., 12, 13) capable of extension and retraction; a track (e.g., 14) slidably engaged within the second tube and adapted to be extended and retracted therefrom; clamping means (e.g., 20, 22) mounted on the top surface of the beam and track for gripping or clamping the roof of an automobile when the device is transversely positioned through the inside of the automobile passenger compartment; a trolley (e.g., 15) and vertically connected winch (e.g., 16) mounted on the track and adapted to roll along the track length into and out of the automobile passenger compartment; a seat (e.g., 18) connected to the winch assembly by a winch yoke (e.g., 19) such that the seat may be vertically lifted by means of the winch; a safety latch (e.g., 98) and trolley release assembly (e.g., 99) for preventing the trolley from inadvertently rolling and disengaging the track; a ratchet (e.g., 50) mounted on the track and positioned to selectively engage a ratchet rack (e.g., 44) mounted on the inside of the second tube for selectively and securely positioning the track within the beam at a desired length; and a release tube (e.g., 60) operatively connected to the ratchet head for releasing and engaging the ratchet to the ratchet rack.

In operation, the beam and slidable track are extended to a length sufficient to traverse the passenger compartment along the width of the roof inside surface and are securely clamped by the clamping means to the outside surface of the roof. The trolley and appended winch are engaged within the track and are rolled to a position over the invalid or incapacitated occupant of the automobile. The seat portion of the invention is then positioned around the person to be transferred and the winch is connected to the seat through use of the winch yoke. Thereafter, upon secure engagement, the winch is activated and the seat is vertically lifted, together with its occupant, a short distance above the passenger seat of the automobile. The trolley and appended winch are then rolled to a point outside of the automobile (e.g., over a waiting wheelchair), and the winch is activated to lower the seat and its occupant into the wheelchair. This procedure can be reversed for transporting an invalid or incapacitated person from a point outside the automobile to an automobile passenger seat.

Accordingly, the general object of the invention is to provide a device for transferring an incapacitated person or invalid to and from the passenger seat of an automobile.

Another object of the invention is to provide a device for transporting an invalid or incapacitated person in a safe manner and without the need for extraordinary safety efforts by the assisting operator.

Still another object of the invention is to provide a device that is easily assembled, stored and operated by a single person without the need for modification of the automobile the use of tools or other assisting devices.

A further object of the invention is to provide a device that may be readily adapted to fit almost any roof design or configuration so that the device may be easily transferred from one vehicle to another.

These and other objects and advantages of the invention will become apparent from the remainder of the specification, the drawings and the claims that follow.

MODE(S) OF CARRYING OUT THE INVENTION

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention, generally shown at 10 of FIG. 1, provides a device for transferring an invalid or incapacitated person from a first position in the passenger compartment seat of an automobile to a second position outside and adjacent to the automobile, and vice-versa.

Specifically, as is shown in FIGS. 1, 3, 4 and 16, the invention comprises a beam 11, formed by the telescopic joinder of a first tube 12 and second tube 13. Slidably interposed within the second tube is a track 14 adapted to support a trolley 15 and connected winch 16. A seat 18 is operatively connected to the trolley by a winch yoke 19, for supporting and lifting the person to be transferred.

Figure 3:
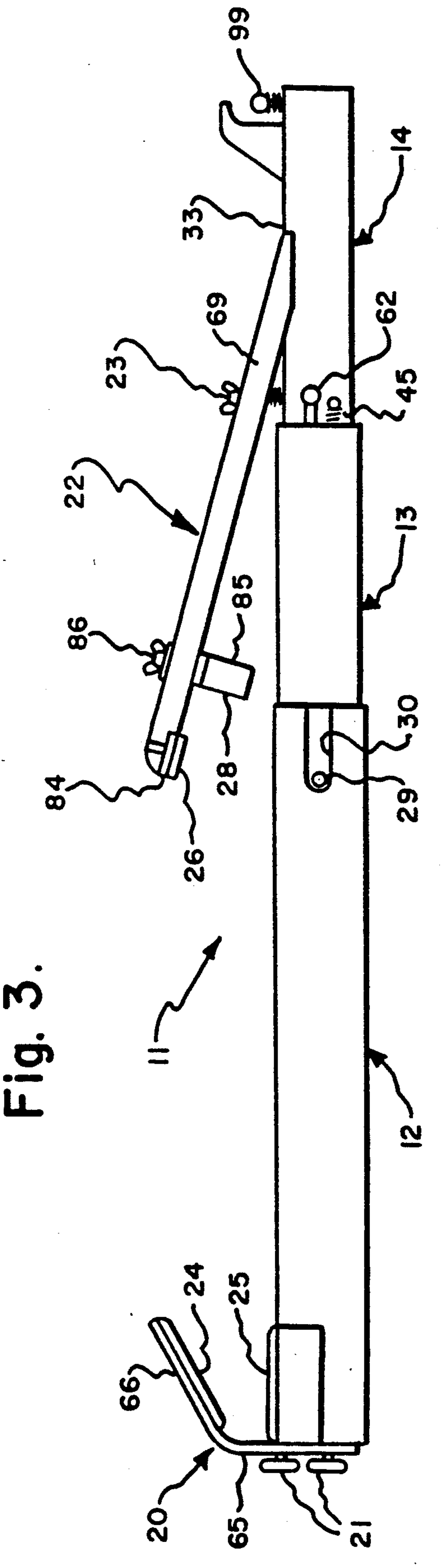
FIG. 3 is a rear view of the device showing the beam and track, with the trolley and winch assembly removed.
Figure 4:
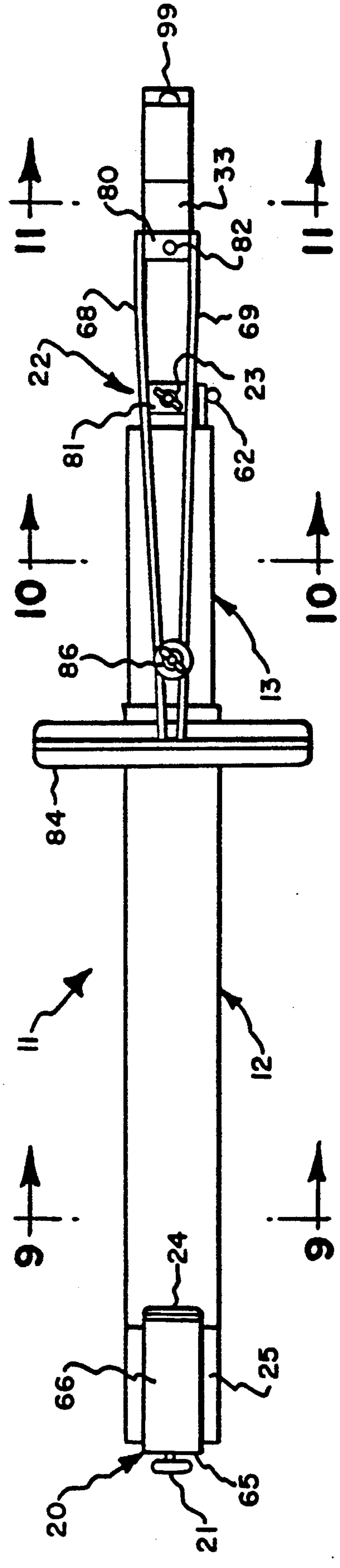
FIG. 4 is a top plan view of the beam and track assembly.

Continuing to advert to FIGS. 1, 3 and 4 the invention is shown to further include a first clamp 20 appended to the end of the first tube and which is adjustable in the vertical direction through the use of adjustment screws 21. A second clamp 22 is adjustably mounted to the top surface of the track and it, too, is vertically adjustable through the use of wing nut and screw 23. Each of the clamps, 20, 22, include padded surfaces, 24, 25, 26 and 28 for contact with the roof of the automobile.

As shown in FIG. 1, the specially configured seat is attached to the trolley and winch by winch yoke 19 and is capable of being vertically lifted thereby. Accordingly, as is described in detail, ante, the beam and track are transversely positioned through the inside roof surface of the automobile and are secured by the clamps to the outside surface of the automobile roof. Thereafter, the invalid occupant is positioned in the seat, raised using the appended winch and yoke and is then slided along the track out of the passenger compartment to a point adjacent to the automobile, e.g., to a waiting wheelchair.

Figures 9, 10, 11:
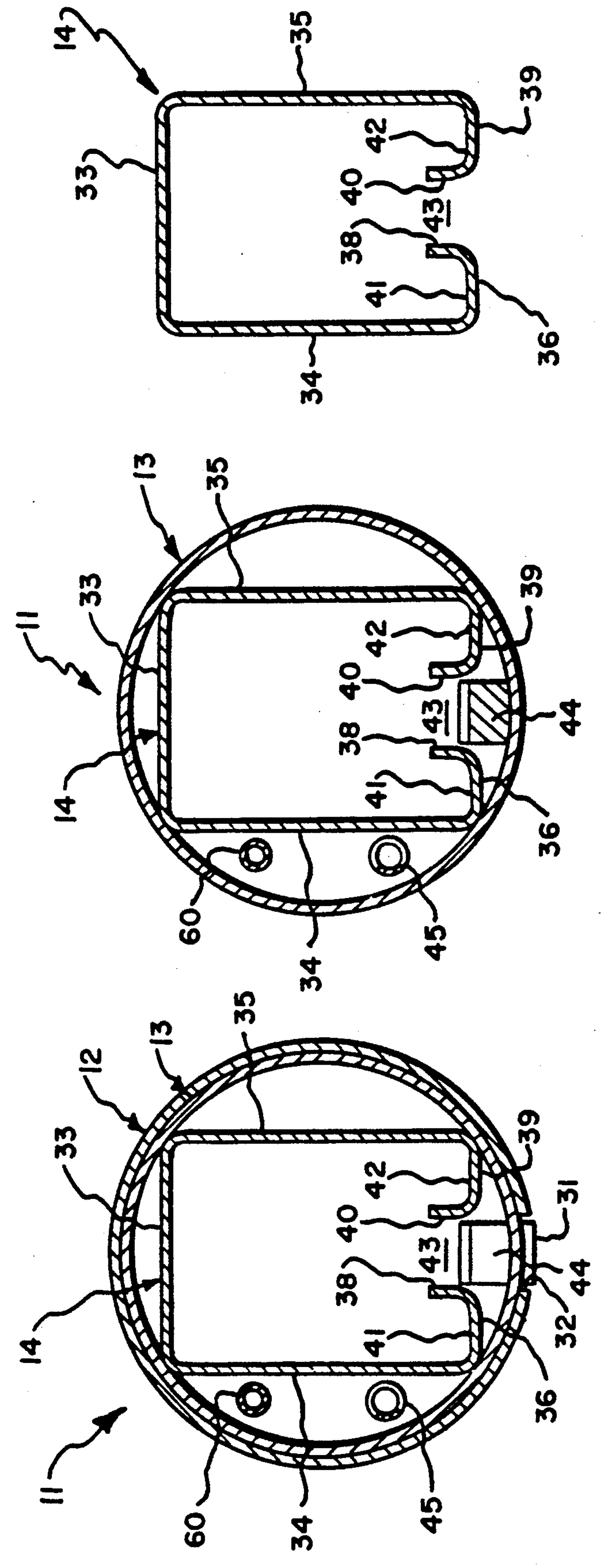
FIG. 9 is a transverse cross-sectional view of the beam along 9—9 of FIG. 4.
FIG. 10 is a transverse cross-sectional view of the device taken along 10—10 of FIG. 4.
FIG. 11 is a transverse cross-sectional view of the track taken along 11—11 of FIG. 4.

Specifically, adverting to FIGS. 3, 9 and 10, beam 11 is shown to be comprised of a substantially round, thin walled hollow first tube 12, which is telescopically engaged by a similar round, thin walled hollow second tube 13 of slightly smaller diameter. Each of the two tubes is formed of a strong metal, alloy or other similarly supportive material. Second tube 13 slides within first tube 12 and is held in position by a locking pin 29 which is mounted on an elongated plate 30 connected to the first tube. The second tube has variety of through holes (not shown) along its length into which locking pin 29 can be inserted. Accordingly, second tube 13 can be held fast within first tube 12 to form a desired beam length appropriate for the width of a particular automobile roof surface. Referring to FIG. 9, second tube 13 is precluded from rotating within first tube 12 through the insertion of washer 31 into slot 32 interposed on the diameter of the first tube.

Referring now to FIGS. 3, 4 and 9–11, the invention is also shown to comprise a track 14, telescopically received within the diameter of second tube 13. As is best shown in FIG. 11, track 14 is a thin walled, hollow member of substantially rectangular cross-section having a horizontally-extending planar top surface 33, joined at its ends by left vertical and downwardly-extending planar side surface 34 and right vertical and downwardly-extending planar side surface 35. At its lower end, left side surface 34 is joined by rightwardly and horizontally-extending planar surface 36, and vertically upwardly-extending planar surface 38. Similarly, at its lower end, right side surface 35 is joined by leftwardly and horizontally-extending surface 39 and vertical and upwardly-extending surface 40. As a result, left guide slot 41 and a right guide slot 42 are formed at either side of the track, and track gap 43 is formed therebetween.

Adverting now to FIG. 10, track 14 is prevented from rotating within the second tube by ratchet rack 44, an elongated solid member which, at its end, is of substantially rectangular cross-section and which is mounted to the inside surface of the second tube. The cross-sectional width of the ratchet rack 44 fits within track gap 43 thereby preventing track rotation within the second tube.

Figure 12:
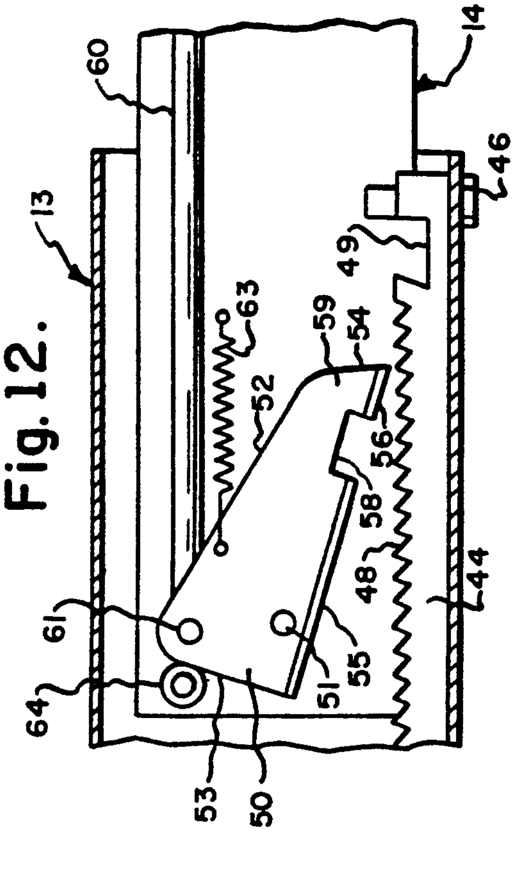
FIG. 12 is a fragmentary longitudinal vertical cross-sectional view of the ratchet assembly with the ratchet release knob depressed.

Referring now to FIGS. 3, 9 and 10, the track is slidably engaged within the second tube and, in its storage position (i.e., unextended), is urged into full engagement with the second tube by track spring 45. Track spring 45 is connected, at one of its ends, to one of the sides of track 14 (e.g., 34 or 35), and at its other end, to the inside of the second tube. Accordingly, when extended, the track is urged back into engagement with the second tube by the force generated through track spring 45. The track, when extended, can be safely and selectively positioned at a point along the second tube length through the depression or release of ratchet release tube knob 62, shown generally in FIGS. 3 and 4. Referring to FIG. 12, ratchet rack 44, mounted to the inside surface of second tube 13 along its length by a series of bolts including ratchet stop bolt 46, is shown to comprise a saw-tooth top surface 48 extending from the rearward end of the second tube toward the opening of the second tube which engages track 14. The ratchet rack terminates at the forward end of the second tube in a planar recess 49 positioned just rearward of ratchet stop bolt 46, extending above the ratchet rack into track 14. As described, ante, ratchet stop bolt 46 precludes the track from extending beyond the length of the second tube and accordingly, from becoming disengaged therefrom. Similarly, planar recess 49 cooperates with ratchet stop bolt 46 to ensure the track is locked in place when fully extended.

Referring to FIGS. 12–15, ratchet head 50 is mounted on a side of track 14 (e.g., 34 or 35) by ratchet head mounting pin 51 and is free to pivot about the pivot point formed by the pin. Ratchet head 50 is specifically shown to be a specially configured, blade-like member having a horizontally-extending planar top edge 52 joined at its left filleted corner by a vertical and downwardly-extending left side edge 53 and at its right filleted corner by vertically and downwardly-extending right side edge 54. The left side edge is longer than the right side edge and accordingly, the horizontal top edge joining the two side edges is slightly sloped. Extending horizontally rightwardly from the bottom end of left side edge 53 is bottom edge 55. Leftwardly and horizontally-extending bottom edge 56 extends from the lower end of right side edge 54. Ratchet recess 58 is interposed between the bottom surfaces and accordingly, ratchet toe portion 59 is formed by the connection of right edge 54, bottom edge 56 and ratchet recess 58.

Figure 2:
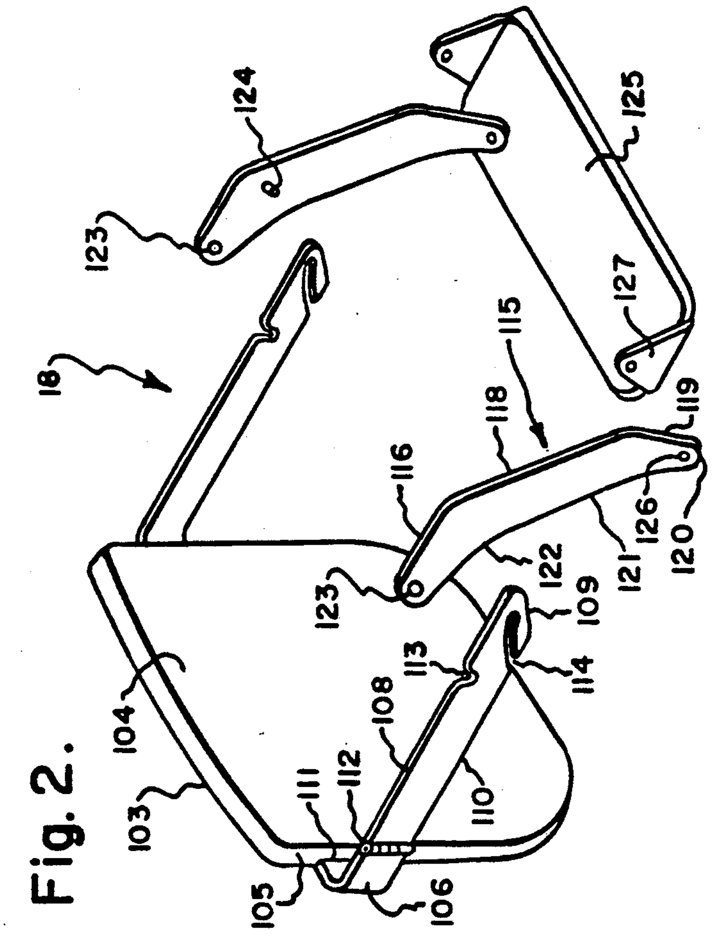
FIG. 2 is an exploded assembly view of the seat.

Continuing to advert to FIGS. 12–15, ratchet release tube 60 is connected to the top left corner of ratchet head 50 by release tube mounting pin 61 and extends on a parallel through the length of the track terminating in release tube knob 62 located along a side of the track (e.g., 34 or 35) as shown in FIG. 2.

Similarly, ratchet spring 63 is operatively connected, at one of its ends, to the track at a point forward of the ratchet head substantially parallel and below the ratchet release tube 60. At its other end, ratchet spring 63 is connected to the ratchet head at a point below and parallel to the release tube mounting pin 61 and its attendant pivot point. Accordingly, the force generated by ratchet spring 63 tends to force ratchet toe portion 59 into engagement with the teeth or planar recess 49 of ratchet rack 44 thereby securing the track at a selected point along the second tube 13. Similarly, depressing ratchet release tube knob 62 results in the ratchet head pivoting around the pivot point of ratchet head mounting pin 51 and accordingly, disengaging ratchet head 50 from the saw tooth top surface 48 or recess 49 of ratchet rack 44. This permits the track to be safely and fully extended or retracted as desired to accommodate operation or storage.

Figure 13:
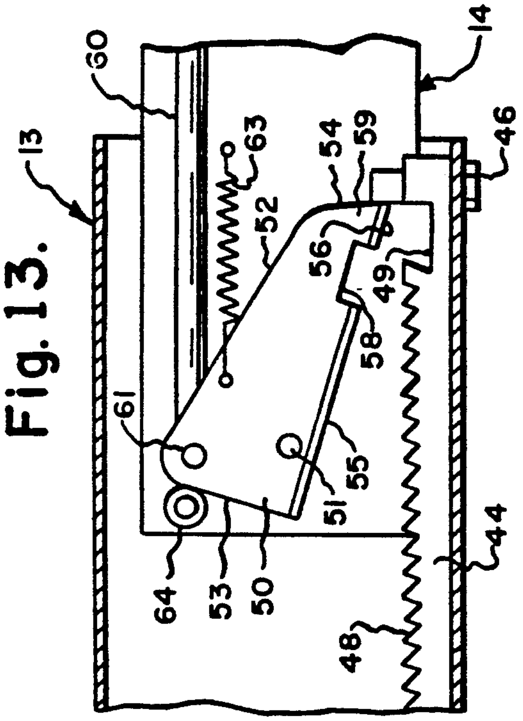
FIG. 13 is a fragmentary longitudinal vertical cross-sectional view of the ratchet assembly with the ratchet release knob depressed and the track fully extended.

As shown in FIG. 13, deflection pin 64 is mounted to one of the sides of track 14 (e.g., 34 or 35) at a point adjacent and rearward of the ratchet head and ratchet release tube and accordingly, prevents severe rotation of the ratchet head such that ratchet toe portion 59 would rotate above ratchet stop bolt 46. Accordingly, once interposed within the second tube, the ratchet assembly controls and locks the position of the track and also ensures secure and safe operation of the track and device.

In particular, FIG. 12 shows the ratchet head disengaged from the ratchet rack; i.e., ratchet release tube knob 62 has been depressed and accordingly, ratchet release tube 60 has caused the ratchet head to pivot around ratchet head mounting pin 51 thereby raising the ratchet toe portion 59 above the ratchet rack saw tooth top surface 48. In this position, the track may be freely extended and retracted along the length of second tube 13.

As shown in FIG. 13, however, the track may only be extended to a point rearward of ratchet stop bolt 46 which, working in cooperation with ratchet deflection pin 64, ensures that the ratchet toe portion contacts the stop bolt at the maximum point of extension thereby effectively precluding the track from becoming inadvertently disengaged from the second tube.

Figure 14:
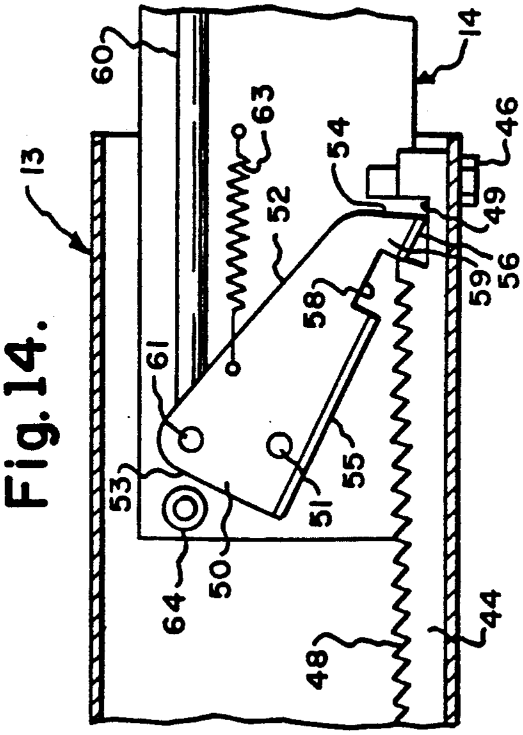
FIG. 14 is a fragmentary longitudinal vertical cross-sectional view of the ratchet assembly with the ratchet release knob released and the track fully extended.

Similarly, FIG. 14 illustrates the position of the ratchet head and toe portion when the track is fully extended; i.e., the toe portion upon extension, has contacted ratchet stop 46 and, upon release of the ratchet release tube knob 62, the ratchet head pivots and the toe portion 59 engages ratchet recess 49. The track is thereby secured within the second tube at its maximum point of extension.

Figure 15:
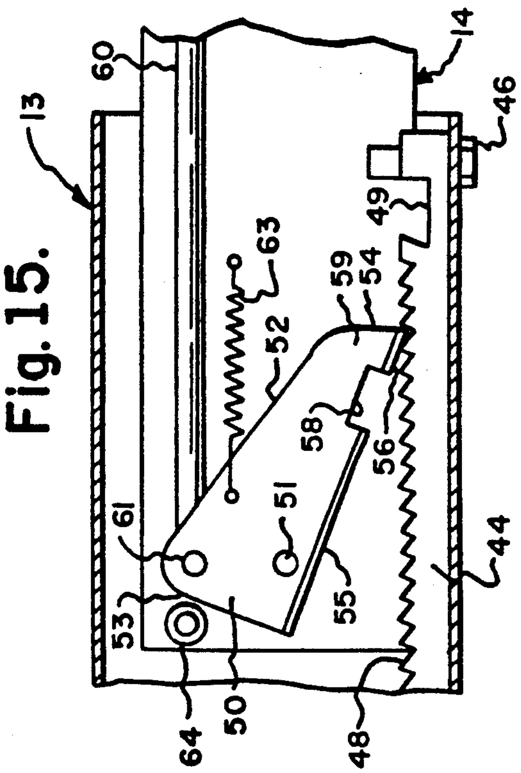
FIG. 15 is a fragmentary longitudinal vertical cross-sectional view of the ratchet assembly with the ratchet release knob released and the track partially retracted.

FIG. 15 shows the track extended to an intermediate position with the ratchet head toe portion 59 engaging the saw tooth top surface 48 of the ratchet rack. Accordingly, until the release tube is engaged lifting the toe portion from the ratchet rack, the track is securely engaged at the desired intermediate point for operation.

Adverting now to FIGS. 3, 4 and 5–7, the device is shown to be secured to the roof of an automobile by first clamp 20 and second clamp 22. In particular, the first clamp is a specially configured flange-like member comprised of a vertical and upwardly-extending partially slotted surface 65 joined at its upper and filleted corner by an upwardly and rightwardly angled top surface 66. The first clamp is mounted on the left marginal end of first tube 12 by adjustment screws 21 which can be loosened and tightened to provide vertical positioning of the first clamp along its vertical slot, depending upon the roof surface and configuration of the automobile. Padded surface 24 is mounted along the underside of first clamp top surface 66 and faces a padded surface 25 mounted along the top of the first tube just forward of the first clamp mounting point for the purpose of insuring that the roof portion to be gripped thereby can be safely and securely engaged.

Second clamp 22 is provided to secure the invention at its track end to the automobile roof. In particular, as shown in FIGS. 3 and 4, the second clamp is a generally elongated member having two planar side members 68 and 69 joined by cross members 80 and 81. In particular, side members 68 and 69, at their one end, straddle the top surface of the track and gradually merge closer together at their other end. First cross member 80 is positioned at the point where side members are mounted to the top of the track. Cross member 80 further comprises a through hole and bolt 82 adapted to be inserted in a corresponding through hole in the track top surface to secure the clamp to the track. Bolt 82 can be tightened or loosened and accordingly, the clamp is free to be slightly upwardly angled as desired to accommodate various automobile roof designs.

Second cross member 81 located intermediate the length of the second clamp further supports and joins the side members 68 and 69 and has a through hole and wing bolt 23 which fits a corresponding through hole in the track top surface. Wing bolt 23 can be selectively adjusted to support the desired incline angle of the second clamp. For example, tightening of wing bolt 23 will flatten the angle of incline and similarly, loosening of wing bolt 23 will steepen the angle. Selectively controlling the angle of the second clamp ensures the clamp can be securely fastened to the automobile roof regardless of configuration.

Adverting now to FIGS. 3 and 4, the second clamp further includes, at its other marginal end, an elongated padded clamping surface 84 mounted transversely across the joining point of clamp side member 68 and 69. The underside of clamping surface 84 is covered by padded surface 26 which further enhances safe and secure gripping of the roof top surface. Referring to FIG. 3, a short distance rearward of clamping surface 84 is mounted a clamping stop edge 85, a substantially rectangular block-like structure mounted transversely across sides 68 and 69 of the second clamp. As shown in FIG. 4, clamping stop edge 85 is positionable along the length of the second clamp by a wing nut and washer 86 which also serves to mount the stop edge to the second clamp. Thus, when wing nut and washer 86 is loosened, the stop edge can be slidably moved between the clamp side members to a desired position, depended upon the roof configuration of the automobile. Thereafter, the wing nut and washer can be tightened and secured sufficient to hold stop edge in the desired position. This, too, facilitates proper clamping and securing of the device to the roof for safe operation.

Figures 5, 6, 7, 8:
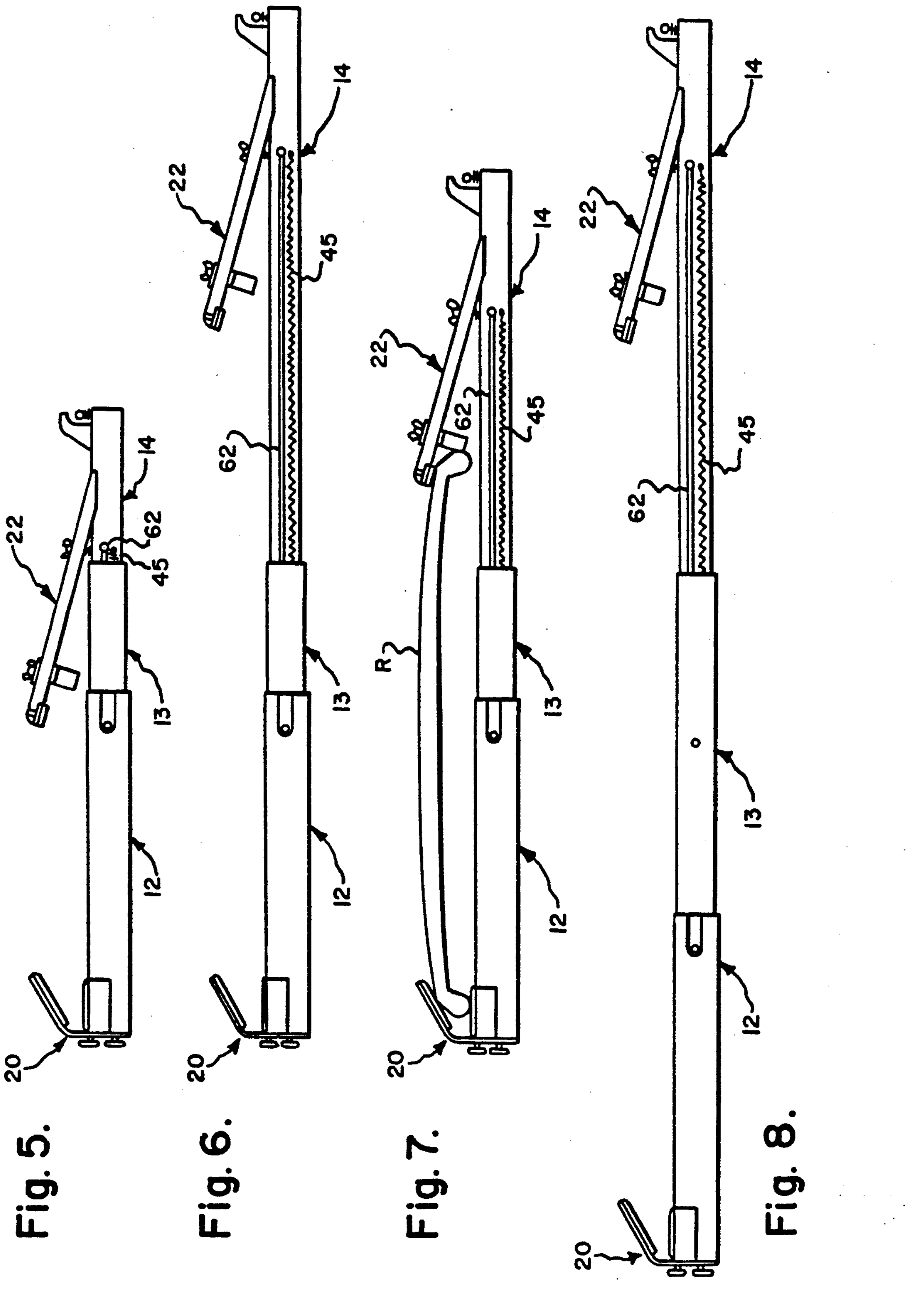
FIG. 5 is a rear view of the device in a storage configuration.
FIG. 6 is a rear view of the device with the track fully extended and locked.
FIG. 7 is a rear view of the device securely retracted and clamped onto the outside surface of an automobile roof.
FIG. 8 is a rear view of the device with both of the beam tubes and the track fully extended and locked.

FIGS. 5–8 illustrate generally the various positions of the device. In particular, FIG. 5 shows the device in the storage position; i.e., with the first tube and second tube fully engaged and the track fully retracted within the second tube. In this position, the preferred embodiment of the device is approximately four feet in length and accordingly, can be easily stored in the rear seat or trunk of an automobile.

FIG. 5 shows the invention with the track fully extended away from the second tube and with the first and second tubes slightly extended. This would typically be the position of the device for use with a mid-size or intermediate size automobile.

FIG. 7 shows the invention appended to the roof, R, of a compact or smaller automobile. In this position, the first and second tube are fully engaged and the track is slightly extended from the second tube. FIG. 7 further illustrates the "clamping" or "gripping" of the first and second clamps to the roof configuration and incline angle.

FIG. 8 illustrates the invention with both the first and second tubes and the track in fully extended positions. This position provides a maximum traverse width and accordingly, is normally used in operation with luxury or full-size automobiles.

Generally, after operation and use of the invention over a period of time, an operator will be well acquainted with the appropriate position of the device for any number of relevant automobiles or vehicles. Thereafter, extension and placement of the device on an automobile will become routine and easily and conveniently accomplished without further experimentation or trial and error.

Figure 17:
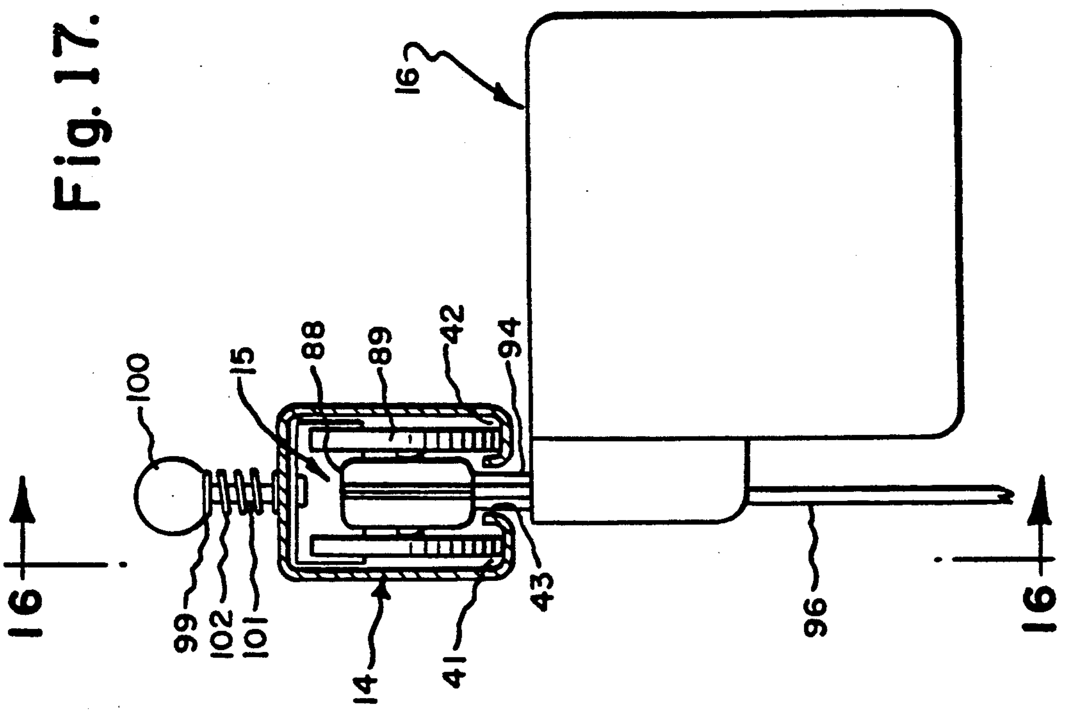
FIG. 17 is a fragmentary transverse cross-sectional view of the winch mounted in the track with the trolley latch engaged on the trolley.
Figure 16:
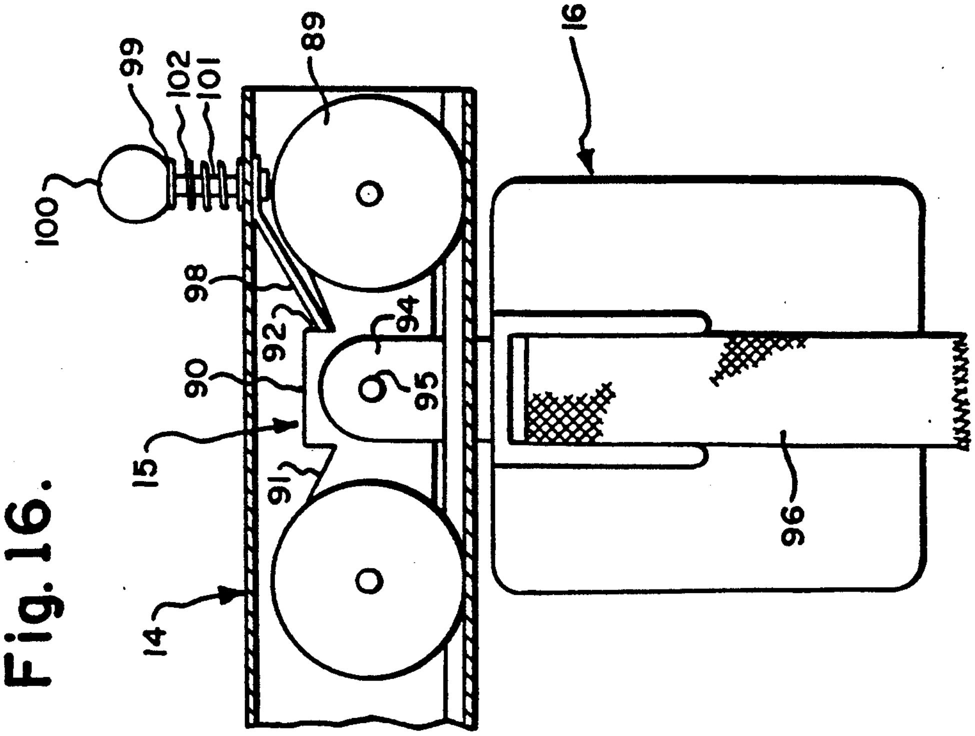
FIG. 16 is a fragmentary longitudinal vertical cross-sectional view of the winch mounted in the track with the trolley latch engaged on the trolley.

As shown in FIGS. 1 and 16–17, the invention further comprises a trolley 15 and winch 16 providing a vertical force for lifting the invalid or incapacitated individual to and from the automobile seat. In particular, adverting to FIG. 16, trolley 15 is shown to comprise a block-like body portion 88 interposed and connected between two sets of parallel rollers 89. Trolley body portion 88 has a specially-configured top surface 90 which includes, at either end, inwardly angled locking ramps 91 terminating at either side of a trolley stop surface 92. Continuing to advert to FIG. 16, trolley body portion 88 is connected to winch 16 by a horizontal and downwardly-extending connector member 94 pivotally attached to the trolley body portion by a trolley attachment pin 95. As is shown in FIGS. 16 and 17, the trolley connector member extends vertically downwardly below the track through track gap 43. Connector member 94 is free to pivot around the pivot point provided by trolley attachment pin 95. Winch 16 is operatively attached to the connector member below the track surface and is further arranged to provide a winch line 96 extending vertically downwardly directly under the track. Winch 16 can be battery powered or manually operated; however, a compact battery operated unit is desired in the preferred embodiment of the invention.

Continuing to advert to FIGS. 16 and 17, in operation, the trolley and winch are interposed within the track by inserting the trolley rollers 89 into track left and right guide slots 41 and 42. Specifically adverting to FIG. 17, when the trolley rollers are fitted within the guide slots, the trolley body portion is positioned therebetween with the connector member extending vertically through track gap 43. The trolley and winch are therefore free to roll along that portion of the track extending from the second tube.

Adverting to FIG. 16, the trolley and winch are precluded from inadvertently rolling and disengaging from the track end through the cooperation of trolley locking ramps 91, trolley stop surface 92 and trolley safety latch 98. In particular, trolley safety latch 98 is a specially configured thin-walled elongated member which is mounted on the inside of track top surface 33 and is angled downwardly to fit within trolley locking ramp 91 and against trolley stop surface 92. The trolley safety latch is mounted to the top planar surface 33 of the track by trolley release knob assembly 99. The trolley release knob assembly is comprised of a knob 100 and connected mounting peg 101 which passes through the track top surface and is configured to flexibly secure the latch to the underside thereof. A latch spring 102 encases the outside of the mounting peg and accordingly, when the trolley release knob is depressed and moved sideways, the spring loaded mounting peg forces the safety latch out of the locking ramp and free of the stop surface thereby permitting the trolley to be removed from the track upon disassembly of the device.

As can be readily seen from FIG. 16, use of two locking ramps enables either end of the trolley and winch to be inserted into the track upon assembly. This avoids any confusion when the device is assembled. In addition, it can also be readily appreciated that the configuration of the safety latch and trolley release knob enables the trolley to be freely inserted into the locked position; i.e., the safety latch and locking ramps are configured such that the safety latch will merely roll over the top of the rollers when the trolley is inserted into the track. The latch will not, however, permit the trolley to roll off or out of the extended portion of the track unless the trolley release knob is properly operated.

Figure 20:
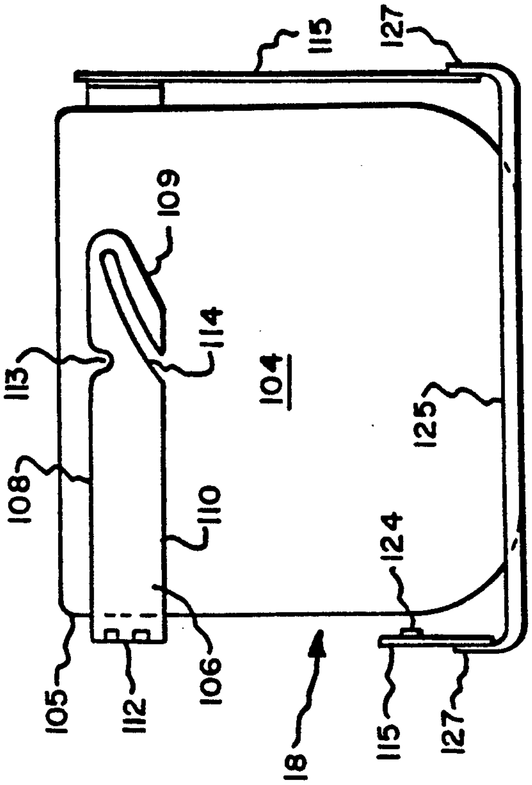
FIG. 20 is a front view of the partially assembled seat components.
Figure 18:
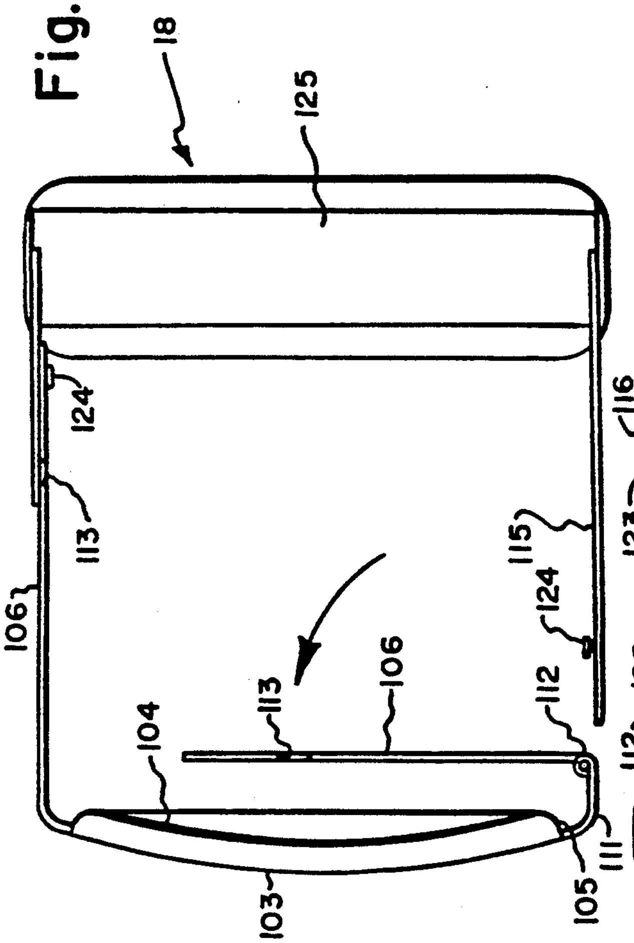
FIG. 18 is a top plan view of the partially assembled seat components.

Adverting now to FIGS. 2 and 18–21, the invention is shown to further comprise a seat 18 for safely and efficiently lifting the incapacitated or invalid individual to or from the automobile. In particular, seat 18 comprised of a back 103 which is shown to be a substantially rectangular member having a slightly bowed arcuate inside portion 104 for accommodating the general shape of a person's back or substantially vertical and downwardly-extending side surfaces 105 capable of supporting a side arm 106. Side arm 106, connected to seat side 105 by a hinge, is a specially configured rightwardly-extending elongated member comprised of top edge 108, downwardly and leftwardly angled right side surface 109, leftwardly and horizontally-extending bottom surface 110 and vertical and upwardly-extending left end connecting surface 111. Hinge 112 is interposed slightly forward of the connection of the side arm with the seat side and permits the arm to be folded practically against the seat surface for storage purposes as is shown in FIGS. 18 and 20. Adverting to FIG. 19, interposed along top surface 108 is recess cavity 113 and, further, extending upwardly and rightwardly from bottom surface 110 is mounting slot 114.

Figure 19:
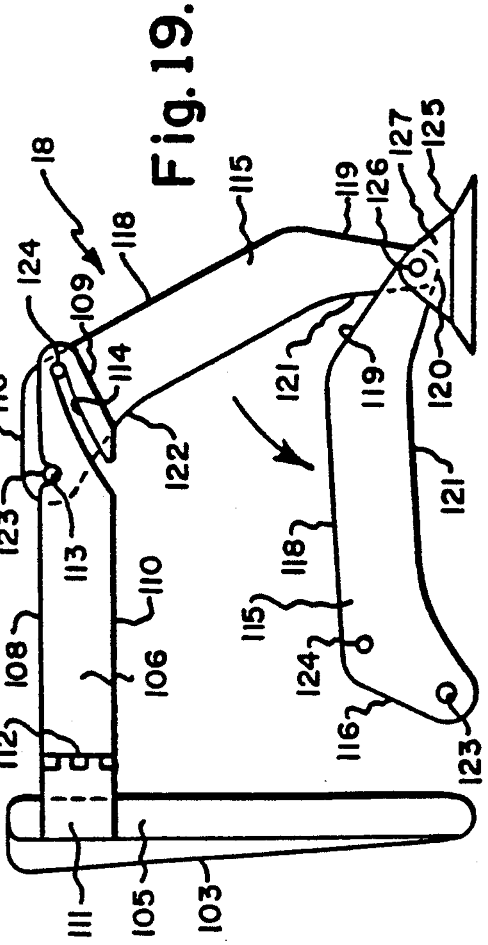
FIG. 19 is a side view of the partially assembled seat components.

Continuing to advert to FIGS. 2 and 19, the seat is shown to be further comprised of side legs 115 which are adapted to be operatively connected to the seat arms 106. In particular, the side legs are specially-configured thin-walled members comprised of a top surface 116, a downwardly and slightly angled first side surface 118, a vertically and downwardly-extending second side surface 119, a rounded and upwardly-facing filleted bottom surface 120, a vertical and upwardly-extending third side surface 121 and an upwardly and angled fourth side surface 122. Side leg 115 further includes a lifting hole 123 positioned in the upper left hand portion of the side leg and a side leg mounting pin 124 positioned approximately parallel to and to the right of the lifting hole along the top portion of the side leg. Continuing to advert to FIGS. 2 and 19, when assembled, lifting hole 123 is shown to fit cooperatively adjacent cavity 113 when side leg mounting pin 124 is fully engaged within slot 114. When so engaged, the side leg is free to pivot about the pivot point created by the side leg pin as it is engaged in slot 114.

Continuing to refer to FIGS. 2, 18, 19 and 20, thigh board 125 is shown to be pivotally connected to the lower portion of side legs 115 by thigh board mounting pins 126. As is particularly shown in FIGS. 2 and 18, thigh board 125 is an elongated substantially rectangular "seat-like" member used to support the thighs of the invalid or incapacitated person to be transferred. The thigh board further includes at either end vertically upwardly-extending side mounts 127 having a hole 132 for pivotally receiving mounting pin 126. Since it is pivotally connected to the lower portion of the side legs, the side board is able to rotate about its longitudinal axis to conform to the size and weight of the person to be transferred.

Figure 21:
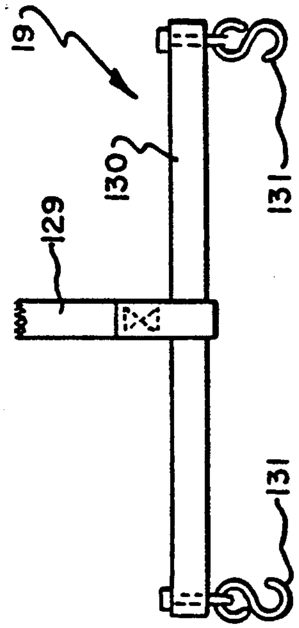
FIG. 21 is a plan view of the winch yoke assembly.

Adverting now to FIG. 21, the invention is shown to further include a winch yoke 19 for connecting the seat to the trolley and winch. In particular, the winch yoke is shown to include strap 129 connected to winch line 96 (not shown) and to the midpoint of an elongated cross member 130, having a length approximately equal to the width of seat 18, and seat hooks 131 operatively connected to each end of the cross member and capable of being inserted into lift holes 123.

In operation, the beam and track assembly is first mounted to traverse the inside of the roof of an automobile out of or into which an incapacitated or invalid person is to be transferred. Specifically, the operator will lower the window of the driver's side (assuming the invalid is seated in the passenger side of the automobile) and will affix the first clamp to the roof surface extending the remaining beam through the passenger compartment. The passenger side door may then be opened and the beam and track positioned for operation by (1) extending the first and second tubes to an appropriate position such that the track can be extended over the passenger's seat of the automobile and (2) extending the track by depressing the release tube knob to fully traverse the width of the automobile passenger compartment to a point just adjacent to the automobile. At this point, the second clamp can be vertically positioned and the clamp stop edge adjusted along its length to accommodate the roof surface. The operator may then insure that the first clamp adjustment screws are properly tightened and the first clamp is securely fastened to the roof. After the beam and track are appropriately positioned, the operator next slides the trolley and winch into the track and ensures the safety latch will prevent the trolley from falling out of the track inadvertently. The operator then places the seat back and attached side arm behind the invalid to be transferred and also places the thigh board and side leg assembly beneath the thighs. The side legs and side arms are then joined by interposing the side leg mounting pins within the slots of the side arms. The trolley is then slidably positioned over the invalid positioned in the seat and the winch yoke lowered such that the winch hooks can engage the seat lift holes. Once the lift hooks are securely fastened within the lift holes, the winch can be activated to produce a vertical lifting force on the seat by way of the winch line and connected winch yoke.

This lifting force will begin to lift the seat from the seat and simultaneously, will force and maintain the thigh board beneath the invalid by producing a rearward force on the thigh board. This rearward force on the thigh board results from the vertical lifting force being behind the pivot point of the mounting pin and slot of the side arms and side legs. This, in turn, ensures that the individual to be transported is fully and securely supported by the seat without regard to weight, body size or body movement. Further, the pivotal attachment of the winch connecting member ameliorates the effect of any side loading between the winch, winch line and winch yoke caused by movement of the invalid or rolling of the trolley and winch.

After the invalid is safely lifted a short distance above the passenger seat, the trolley can then be rolled outwardly (if the invalid is being removed from the automobile) to a point adjacent the automobile e.g., to a waiting wheelchair. The operation is then reversed and the invalid is placed safely into the wheelchair. Thereafter, the winch strap and yoke are disengaged; the seat components are disassembled and removed; the winch safety latch is disengaged; the winch and trolley removed from the beam and track; and finally, the clamps are disengaged allowing for removal of the device for storage purposes.

MODIFICATIONS

The present invention contemplates that many changes and modifications may be made. For example, various types and shapes of clamping means may be employed to secure the various components of the device to the roof of the automobile. In addition, various other methods are contemplated to telescope and lock the first and second portions of the beam and to provide for a safe extension and retraction of the track. In addition, various type of lifting means aside from a winch, can be incorporated as part of the invention. Various types of track configurations and trolley bodies are also contemplated and would be readily apparent to one of ordinary skill in the art.

Accordingly, while the preferred embodiment of the invention has been shown and described, a number of modifications thereof mentioned, persons skilled in the art will readily appreciate that various additional changes and modifications may be made without department from the spirit of this invention, as defined and differentiated by the claims herein.

I claim:

1. A device for transferring an invalid from an automobile to a location distant thereof and vice versa, comprising:

a support beam having a first tube and a second tube, said first tube being adapted to telescopically receive said second tube, said support beam extending transversely of the roof of an automobile, said roof having a widths, an inside surface and an outside surface; said support beam extending the width of said roof along said inside surface;

a track of a fixed length connected to said support beam, said track being adapted to be selectively moved toward and away from said support beam;

a first clamp mounted on said support beam for securing it to said roof;

said first clamp being mounted to said first tube and includes means to adjustably engage said outside surface of said roof;

a second clamp mounted on said track for securing it to said roof;

said second clamp includes means to adjustably engage said outside surface of said roof;

trolley means mounted on said track and adapted to traverse the length thereof;

lifting means operatively connected to said trolley means for providing a substantially vertical lifting force;

seat means, adapted to support a person or other load, operatively connected to said lifting means and adapted to be lifted in a vertical direction;

said second tube includes a ratchet rack having a saw-toothed top surface mounted along the longitudinal length thereof;

ratchet means including a ratchet release handle mounted on said track for selectively extending and retracting said track from said second tube and for locking said track at a selected position along said second tube; and wherein said ratchet means comprises a spring loaded ratchet head adapted to be activated by said ratchet release handle, said ratchet head being operative to selectively engage said teeth of said ratchet rack.

2. The device according to claim 1 wherein said telescopically received second tube is adapted to be selectively positioned within said first tube.

3. The device according to claim 2 further comprising locking means for selectively positioning said second tube telescopically within said first tube such that said tubes are securely engaged.

4. The device according to claim 3 wherein said locking means is comprised of a movable pin and plate connected to said second tube adapted to cooperate with a series of engagement holes arranged along the length of said first tube.

5. The device according to claim 1 wherein said beam is arranged to traverse the width of said roof across said roof inside surface.

6. The device according to claim 1 wherein said trolley means comprises a plurality of rollers adapted to roll along the length of said track and to be selectively positioned therealong.

7. The device according to claim 6 wherein said track further comprises a plurality of guide slots adapted to receive said rollers of said trolley.

8. The device according to claim 1 wherein said lifting means is a winch connected to said trolley means and adapted to provide a substantially vertical lifting force.

9. The device according to claim 8 wherein said lifting means further comprises a yoke, connected to said winch, having a plurality of hooks capable of engaging said seat.

10. The device according to claim 1 further comprising a trolley latch operatively arranged to selectively lock said trolley means on said track.

11. The device according to claim 1 wherein said seat comprises a back having an upper portion and a lower portion, a left arm and a right arm having a forward end and a rearward end, said left arm and said right arm connected to said upper portion of said back, a left leg and a right leg having an upper end and a lower end, said left leg and said right leg pivotally connected at their upper ends to the forward end of said left arm and said right arm respectively, a thigh board having a first end and a second end, said first end pivotally connected to one of said legs and said second end pivotally connected to the other of said legs, said legs further adapted to be connected to said lifting means such that lifting means vertical force results in a rearward force on said thigh board.

* * * * *